March 28, 1950 H. A. WALLACE 2,502,123

RAILWAY TRAIN COMMUNICATION APPARATUS

Filed March 6, 1946 2 Sheets-Sheet 1

INVENTOR
Herbert A. Wallace.
BY
A. L. Vencill
HIS ATTORNEY

March 28, 1950 H. A. WALLACE 2,502,123

RAILWAY TRAIN COMMUNICATION APPARATUS

Filed March 6, 1946 2 Sheets-Sheet 2

INVENTOR
*Herbert A. Wallace.*

BY *A. L. Vencill*

HIS ATTORNEY

Patented Mar. 28, 1950 2,502,123

UNITED STATES PATENT OFFICE 2,502,123

RAILWAY TRAIN COMMUNICATION APPARATUS

Herbert A. Wallace, San Francisco, Calif., assignor to The Union Switch and Signal Company, Swissvale, Pa., a corporation of Pennsylvania Application March 6, 1946, Serial No. 652,292

5 Claims. (Cl. 179—6)

Figure 1:
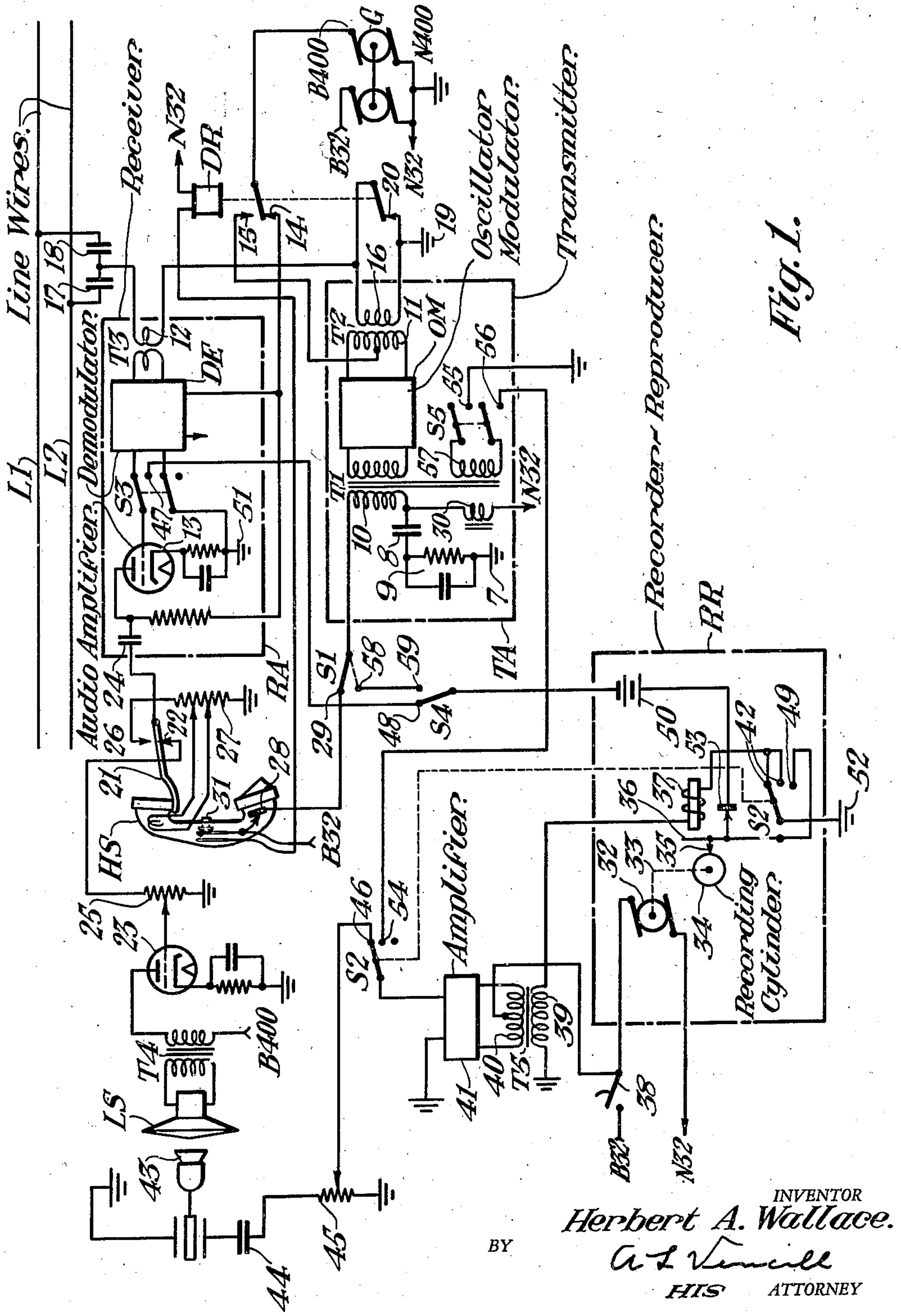

My invention relates to railway train communication apparatus, and more particularly to such apparatus for use when train orders and similar messages are transmitted by voice.

In customary train operation under the train order system the dispatcher, or his deputy, writes each train order in his order book and transmits it by telegraph or telephone to operators at train order offices along the trackway. The further duty of these operators is to deliver copies of these orders to those of the train crews to whom they are addressed by the dispatcher.

An operator upon receiving an order from the dispatcher, writes or types it on forms provided for that purpose. Since it is essential to the safety of train operation that the train crew receive a true copy of the original of the dispatcher's order, a method of checking the operator's copy with the dispatcher's order is provided. This consists of requiring each operator who has received the order for delivery to trains, to repeat back to the dispatcher the entire order, word for word, from his own individual copy, while the dispatcher checks each operator's repeat, word for word, against his original copy. The dispatcher will not make orders valid for delivery to trainmen until such checks are made. It is also seen that a permanent record of the correctness of all copies is in possession of the dispatcher.

Railway train communication telephone systems provide facilities through which a dispatcher or operator can talk directly to a train crew member and by which facilities train orders may be issued directly to a train crew. When this is done the checking and recording of the orders of the present day system are lacking.

Accordingly, a feature of my invention is the provision of novel and improved apparatus for railway train communication systems for checking and recording train orders and other messages transmitted through such systems to provide the equivalent safety of the present day systems where we have the intermediary of the operator with the written order, checked with the originator of the order and a record made of its correctness.

To attain the foregoing features, objects and advantages of my invention I provide improved communication equipment including a voice recording and reproducing device and a novel circuit network. This circuit network is provided with switching means disposed in the network in such a manner that the network can be set to condition the recording and reproducing device to either record or reproduce and to operatively associate the device with either the receiver or the transmitter of the communication system, the points for connection to the receiver and transmitter being preselected to properly receive or apply voice frequency currents since such receivers and transmitters are usually designed for carrier current. Under a first and a second arrangement of the network the recording and reproducing device is conditioned to record and is associated with the receiver and transmitter, respectively, a message received from a remote station being recorder when the device is associated with the receiver and the message being transmitted to a remote station being recorder when the device is associated with the transmitter. At a third and a fourth arrangement of the circuit network, the recording and reproducing device is conditioned to reproduce and is connected to the receiver and transmitter, respectively, a previously recorded message being sounded in the loud-speaker when the device is connected to the receiver and a recorded message being transmitted to a remote station when the device is connected to the transmitter.

I shall describe two forms of apparatus embodying my invention and shall then point out the novel features thereof in claims.

Figure 2:
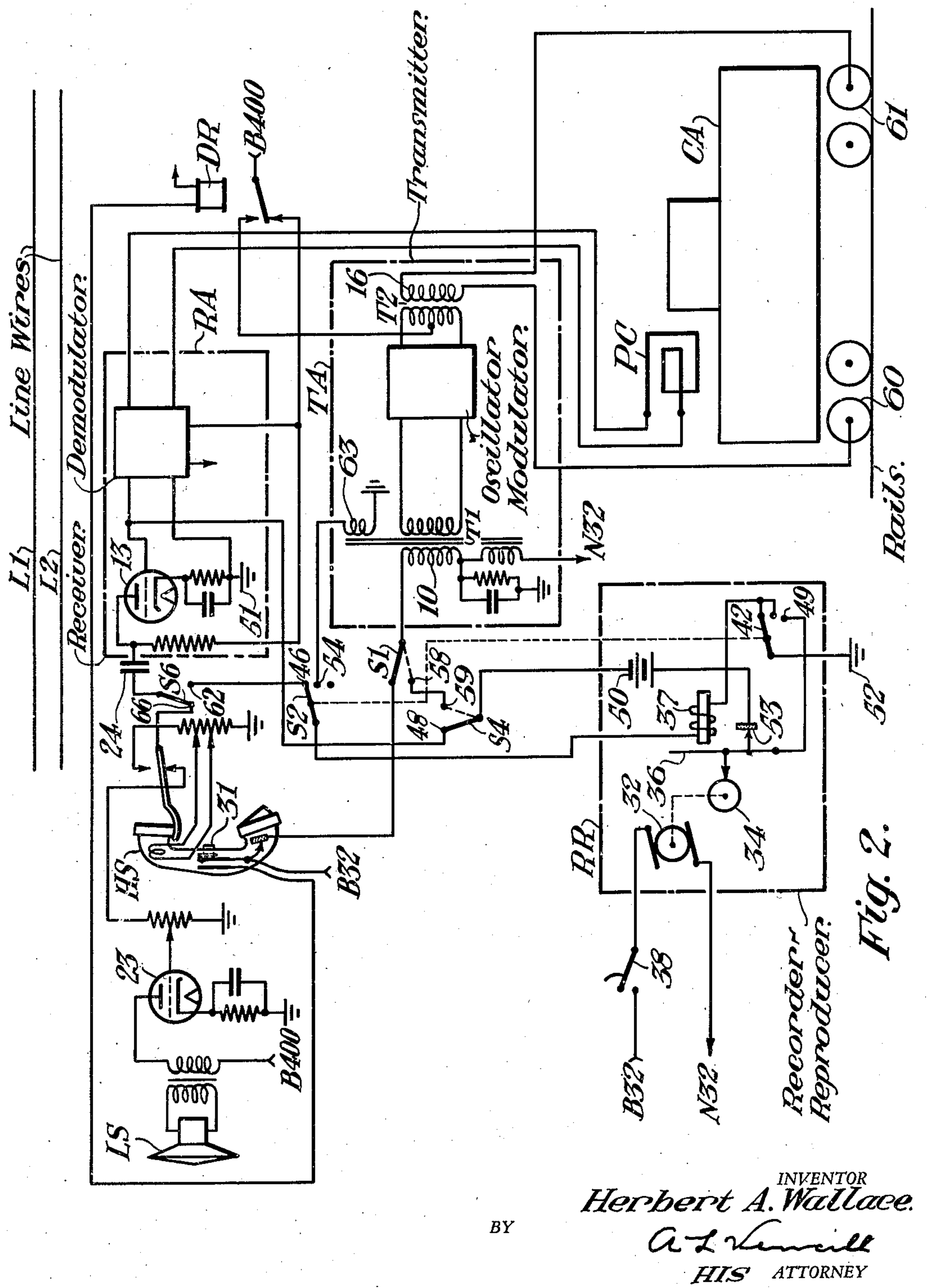

In the accompanying drawings, Figs. 1 and 2 are diagrammatic views showing two different forms of apparatus each of which embodies my invention, the apparatus of Fig. 1 being shown as used at a wayside station of a train communication system and the apparatus of Fig. 2 being shown as used at a train carried station. It is to be understood that the apparatus of Fig. 1 can be used at a train carried station as well as at a wayside station and the apparatus of Fig. 2 can be used at a wayside station as well as at a train carried station.

In each of the two views like reference characters are used to designate similar parts.

Referring to Fig. 1, the dot and dash rectangles RA and TA designate a receiver and a transmitter, respectively, of a wayside station of a train communication system. The receiver RA and transmitter TA may take different forms and may be the receiver and transmitter covered in a copending application for Letters Patent of the United States, Serial No. 575,311, filed January 30, 1945, now Patent No. 2,484,680, granted March 30, 1949, by Paul N. Bossart, for Railway train communication systems.

It is sufficient for the present application to point out that the transmitter TA includes an oscillator-modulator OM through which voice frequencies applied to a primary winding 10 of an input transformer T1 are converted to a frequency modulated carrier telephone current and such current is supplied to a transmitting channel through an output transformer T2, a primary winding 11 of which transformer is connected to the output of the oscillator-modulator OM. The receiver RA includes a demodulator DE through which such frequency modulated carrier telephone current applied to a primary winding 12 of an input transformer T3 is converted to a voice frequency current and applied to a control grid cathode circuit of an audio amplifier tube 13 for amplification.

Two way operation of the apparatus is effected through a directional relay DR, the arrangement being such that relay DR when deenergized to close a back contact 14 completes a circuit by which power is applied to the tubes of the demodulator DE and to the amplifier tube 13 from a generator G having terminals B400 and N400, and the receiver RA is energized and conditioned for reception, but that when relay DR is energized to open back contact 14 and close front contact 15, the generator G is switched from the tubes of the receiver to the tubes of the transmitter and the transmitter is energized and conditioned for sending. The control of directional relay DR will appear hereinafter.

The transmitter TA and the receiver RA are coupled to a transmitting channel which here includes a pair of line wires L1 and L2 extending along the railway, line wires L1 and L2 being ordinarily existing line wires on a pole line along the right of way and used for train communication due to a transmitting channel made up of the line wires, rails, distributed inductance of the line wires and rails and the distributed impedance of the line wires and rails to ground. Primary winding 12 of input transformer T3 of the receiver RA and a secondary winding 16 of output transformer T2 of transmitter TA are included in series in a connection to the line wires L1 and L2. Specifically, two capacitors 17 and 18 in series are connected across the line wires and the junction terminal of the capacitors is connected to a ground electrode 19 through primary winding 12 of transformer T3 and secondary winding 16 of transformer T2, the secondary winding 16 being preferably short circuited through back contact 20 of the directional relay DR.

It follows that normally, that is, when relay DR is deenergized, the receiver RA is active and carrier telephone current supplied to the transmitting channel at some remote point is applied to the receiver through the input transformer T3 and the voice frequencies of the telephone current are reproduced in the output or anode circuit of the audio amplifier tube 13. When relay DR is energized, the transmitter TA is active and carrier telephone current will be supplied to the line wires L1 and L2 of the transmitting channel through output transformer T2.

The amplified voice frequency energy of the receiver RA is applied to a loud-speaker LS or to the earphones of a hand set HS. Normally, that is, when the hand set HS is placed on a hook switch 21 closing a contact 22, the anode circuit of the amplifier tube 13 is coupled to the grid circuit of another amplifier tube 23 through a capacitor 24, contact 22 and a resistor 25, and the anode circuit of the tube 23 is in turn coupled to the loud-speaker LS through a transformer T4. Thus, the voice frequencies of the output of the receiver RA are further amplified at tube 23 and sounded at the loud-speaker LS. When the hand set HS is removed from the hook the contact 22 is opened and a contact 26 is closed and the earphones of the hand set are coupled to the anode circuit of tube 13 through capacitor 24 and a resistor 27. The loud-speaker LS is ordinarily used for receiving a calling current and the hand set is then removed from the hook and the telephone message is received through the ear-phones of the hand set. However, it is clear that a message can be received through the loud-speaker LS by leaving the hand set HS on the hook switch.

The microphone of the hand set HS is coupled to the input of the transmitter TA for the sending of carrier telephone current. The microphone circuit can be traced from terminal B32 of a suitable source of current, such as a battery not shown, through microphone 28, contact 29 of a switch S1 to be referred to hereinafter, winding 10 of input transformer T1 and an inductance 30 to the other terminal N32 of the current source, a unit 9 comprising a resistor and a capacitor in multiple being preferably connected between the winding 10 and a ground electrode 7 through a capacitor 8.

Directional relay DR is controlled through a press-to-talk switch 31 placed on the hand set HS as will be readily understod by an inspection of the drawings. With the press-to-talk switch 31 operated to close its contact, the directional relay DR is picked up and the transmitter TA is energized so that a voice frequency current created by speaking into the microphone of the hand set is converted through the transmitter TA to a frequency modulated carrier telephone current and such carrier telephone current is supplied to line wires L1 and L2 of the transmitting channel.

The station is provided with a recorder-reproducer which is indicated as a whole by a dot and dash rectangle RR. This recorder-reproducer RR may be any one of several different forms and as shown it is of the wax cylinder type having a motor 32 connected through a drive mechanism indicated by a dotted line 33 to a recording cylinder 34 against which a stylus 35 presses, the stylus 35 being attached or otherwise actuated by an armature 36 of an electromagnet 37.

The motor 32 is powered from the B32—N32 current source through a switch 38, switch 38 being preferably a foot switch biased to an open position. The electromagnet 37 is included in a simple circuit including a secondary winding 39 of a transformer T5, and a first and a second position contact 42 of a three position switch S2. Primary winding 40 of transformer T5 is included in the output of an amplifier 41 shown conventionally in block form and is connected to the B32—N32 source through switch 38 for energizing the amplifier 41. Amplifier 41 is provided with an input circuit including a microphone 43, a capacitor 44, a resistor 45 and a first position contact 46 of switch S2. The microphone 43 is preferably of the magnetic type and is positioned to be in acoustic relationship with loud-speaker LS. Thus voice frequencies sounded in the loud-speaker LS are impressed upon the microphone 43 to create in the microphone corresponding voice frequencies and these voice frequencies are amplified at the amplifier 41 and applied to the magnet 37 of the device RR with the result that with the switch S2 set at its first position to close front contacts 42 and 46, and the switch 38 closed to power motor 32 and the amplifier 41, speech sounded in the loud-speaker LS is recorded on the cylinder 34 of the recording and reproducing device RR. Consequently with the receiver RA conditioned for reception and the hand set HS on the hook switch, a message received from a distant station through the transmitting channel is recorded when the switches S2 and 38 are set to associate the device RR with the receiver RA.

The recorder-reproducer RR is provided with a microphone type contact 53 associated with armature 36 for reproducing voice frequencies of a recorded message, the contact 53 being included in a circuit powered by a battery 50. The device RR is associated with the receiver RA for reproducing a message through switches S2, S3 and S4. With switch S2 set to close a third position contact 49, switch S3 set to close a second position contact 47 and switch S4 set to close a first position contact 48, a circuit can be traced from battery 50 through contact 48 of switch S4, contact 47 of switch S3, grid and cathode of amplifier tube 13, ground electrodes 51 and 52, contact 49 of switch S2, armature 36 and contact 53 of device RR to the other terminal of battery 50. With the device RR set to reproduce and switch 38 closed to energize the motor 32 to operate the cylinder 34, the contact 53 is actuated according to the recorded message and the current in the circuit through the battery 50 is varied according to the voice frequencies of the recorded message, and such variations in the current of this circuit are applied to the control grid of tube 13 causing the message to be sounded in the loud-speaker LS or in case the hand set HS has been removed from the switch the message is sounded in the earphones of the hand set.

The recording and reproducing device RR is associated with the transmitter TA through contacts of switches S2 and S5 to record an outgoing message. With switch S2 set to close the second position contacts 54 and 42 and switch S5 set to close contacts 55 and 56, a secondary winding 57 of input transformer T1 of the transmitter TA is connected to the input side of amplifier 41. Thus when a message is spoken into the microphone of the hand set and the message is applied to the transmitter for transmission to a remote station a corresponding voltage is induced in secondary winding 57 and this voltage of secondary winding 57 is amplified at the amplifier 41 and the output of the amplifier 41 serves to correspondingly energize the magnet 37 of the device RR with the result that the outgoing message is recorded on the cylinder 34.

The recording and reproducing device RR is associated with the transmitter TA for sending out a carrier telephone current corresponding to a recorded message through a circuit network controlled by switches S1, S2 and S4. With a switch S1 set to close second position contact 58, switch S4 set to close second position contact 59 and switch S2 set to close third position contact 49, the battery 50 is connected to a circuit that can be traced through contacts 59 and 58, winding 10 of the input transformer T1, unit 9, ground electrodes 52 and 7, contact 49, armature 36 and contact 53 back to the battery 50. With the motor 32 now energized by the closing of the switch 38, the recorded message on the cylinder 34 causes a corresponding variation in the current supplied to winding 10 with the result that the recorded message is applied to the transmitter TA and with the transmitter TA conditioned for sending a carrier telephone current modulated according to the recorded message is supplied to the transmitting channel.

It is apparent from the foregoing description of the apparatus of Fig. 1 that this apparatus has the advantages that the device RR can be associated with the receiver RA to record a train order that has previously been delivered to a train crew and the crew is repeating the order back to the operator at the wayside station. This train order would be recorded while it is also being sounded in the loudspeaker. If the operator desires to further check the repeated orders, the device RR can be associated with the receiver RA and the device RR actuated to reproduce and the recorded orders are sounded at the loud-speaker. Again, the apparatus can be set to associate the device RR with the input of the transmitter TA to record any train order or other message that is being sent to a remote point. If the operator wishes to check the order that has been issued and recorded by the device RR, the device can be associated with the receiver to sound at the loud-speaker the recorded orders. Furthermore, the apparatus can be conditioned for the device RR to be associated with the transmitter TA in such a manner that a message or order that has previously been recorded can be applied to the input of the transmitter and a corresponding carrier telephone current supplied to the transmitting channel for transmission to a remote station.

In Fig. 2, the reference character CA designates a vehicle of a railway train, this vehicle being here considered as a caboose or cabin car of a freight train which operates upon a railway along which line wires L1 and L2 extend. The caboose CA is provided with communication apparatus for communication with remote stations, such as the wayside station of Fig. 1, and which apparatus includes a receiver RA and a transmitter TA similar to the corresponding devices of Fig. 1. The input of the receiver RA is connected to a pick-up coil PC mounted on the caboose in inductive relation to the rails and line wires, the line wires and the rails being included in the transmitting channel for the train communication system, as pointed out hereinbefore. The output of the receiver RA is normally applied to the loud-speaker LS and to the earphones of the hand set HS, the same as in Fig. 1, except to include a first position contact 66 of a switch S6. It follows that a carrier telephone current supplied to the line wires L1 and L2 at some remote station, such as the wayside station of Fig. 1, causes a corresponding voltage to be created in the pick-up coil PC and such voltage thus picked up is applied to the receiver RA where it is demodulated and the voice frequencies of the incoming message are reproduced in the loud-speaker or in the earphones of the hand set.

The transmitter TA of Fig. 2 is coupled to the rails for sending a carrier telephone current, this coupling being completed through a sending loop circuit connected to two spaced pairs of wheels 60 and 61, only one wheel of each pair being shown in the drawing, and which loop circuit is in turn connected to secondary winding 16 of the output transformer T2. It follows that voice frequencies applied to the input transformer T1 of the transmitter TA are converted to a carrier telephone current which is applied to the transmitting channel.

The caboose CA is provided with a recording and reproducing device RR preferably of the same form as that of Fig. 1 although other forms of such devices can be used. The apparatus also includes switching means for associating the recording and reproducing device RR with either the receiver RA or the transmitter TA.

In order to record a message or train order being received at the caboose, the device RR is coupled through switch S6 to the output of the receiver RA. Specifically, a connection extends from coupling capacitor 24, a second position contact 82 of switch S6, first position contact 46 of switch S2, winding of the electromagnet 37 of device RR, contact 42 of switch S2 and ground electrodes 52 and 51. Thus with the foot switch 38 closed to power the motor 32 of device RR, an incoming train order or message is recorded on cylinder 34. It is to be noted that an amplifier corresponding to the amplifier 41 of Fig. 1 can be interposed in this connection to the electromagnet 37 if further amplification of the voice frequency energy is required for the device RR.

If the train crew desires to verify the train order thus recorded, the device RR would be connected to the receiver RA for reproducing and to this end switch S2 would be set to close third position contact 49 and switch S4 set to close first position contact 48 to connect device RR to the input of amplifier tube 13, and switch S6 set to close contact 66 to connect the output of tube 13 to the loud-speaker. Under these circumstances a connection is completed from battery 50 through contact 48 of switch S4 to the grid and cathode circuit of the amplifier tube 13, ground electrodes 51 and 52, contact 49 of switch S2, armature 36 and contact 53 of the device RR to battery 50. With switch 38 set to power the motor 32 and the device RR set to reproduce, the train order recorded on the cylinder 34 will now be reproduced and sounded at the loud-speaker LS or in the earphones of the hand set.

An outgoing message from the caboose can be recorded by setting switch S2 to close second position contacts 54 and 42 and connect the winding of magnet 37 of device RR to a secondary winding 63 of input transformer T1 of the transmitter TA. Voltages wil be induced in the secondary winding 63 corresponding to the outgoing message and with the swtich 38 closed to power the motor 32, the voltages induced in secondary winding 63 wil be supplied to the magnet 37 and the outgoing message will be recorded on the cylinder 34. This message thus recorded can be reproduced at the caboose loud-speaker by the setting of switches S2 and S4 to connect the device RR to the receiver, as explained hereinbefore. Again, a message previously recorded on the cylinder 34 can be applied to the input of transformer TA for transmission to a remote point by the proper positioning of the switches S2, S4 and S1. With switch S4 set to close second position contact 59 and switch S1 set to close second position contact 58 and switch S2 set to close third position contact 49, battery 50 is connected to the input winding 10 of transformer T1 through contact 53 of the device RR and thus with the motor 32 of device RR actuated to operate the device a current varied according to a recorded message will be applied to the input of the transmitter TA through the transformer T1 and a corresponding carrier telephone current will be supplied to the transmitting channel.

It is apparent that the apparatus of Fig. 2 has substantially the same advantages as pointed out for the apparatus of Fig. 1.

It is to be pointed out that in Fig. 2 the switch S6 can be omitted and the recorder RR connected in multiple with the loud-speaker, and with such an arrangement the incoming message can be recorded at the time it is being sounded in the loud-speaker.

Although I have herein shown and described but two forms of railway train communication apparatus embodying my invention, it is understood that various changes and modifications may be made therein within the scope of the appended claims without departing from the spirit and scope of my invention.

Having thus described my invention, what I claim is:

1. In combination with a station of a railway train communication system, means including a transmitter having a microphone and a modulator for converting a spoken message into a carrier telephone current, means including a receiver having a demodulator and a loudspeaker for sounding the message of a carrier telephone current, a recording and reproducing device including a magnet having an armature with a stylus attached thereto for recording the message of a voice frequency current and said device also including a microphonic contact attached to said armature for creating a voice frequency current corresponding to a recorded message, a first circuit means including an element disposed in energy transfer relationship with the output of said receiver to receive voice frequency energy in response to carrier telephone current applied to the receiver and said first circuit means connected to said magnet of said recording and reproducing device to record the message of such voice frequency energy, a second circuit means including a winding coupled to the input of said transmitter to receive voice frequency energy in response to a message spoken into said microphone and said second circuit means connected to said magnet of said recording and reproducing device to record the message of such voice frequency energy, a third circuit means including a current source connected to said microphonic contact of said device to receive voice frequency energy in response to a recorded message, and means including a manually operable switch to connect said third circuit means either to the output of said receiver to sound such recorded message at the loud-speaker or to connect said third circuit means to the input of said transmitter to transmit the recorded message.

2. In combination with a station of a railway train communication system, means including a transmitter and a receiver at said station coupled to a transmitting channel for sending and receiving a carrier telephone current, a microphone and a loud-speaker at said station, said transmitter including an oscillator modulator and having an input circuit connected to said microphone for transmission of a message spoken into the microphone and said receiver including a demodulator and having an output circuit connected to said loudspeaker for sounding a message of the received telephone current, a recorder-reproducer including a first means to record a spoken message and a second means to create a voice frequency current of a recorded message, said recorder-reproducer being provided with a controller operable to different positions to selectively govern said first and second means, circuit means including switching devices to electrically couple said first means of said recorder-reproducer with either said receiver output circuit or with said transmitter input circuit to record the message of a received telephone current or the message spoken into said microphone, and other circuit means including other switching devices to electrically couple said second means of said recorder-reproducer with said receiver output circuit or the transmitter input circuit to either sound in the loudspeaker a recorded message or to transmit such recorded message.

3. In combination with railway train communication apparatus including a transmitter and a receiver of a carrier telephone current coupled to a transmitting channel, said transmitter including an oscillator modulator for supplying a carrier telephone current to its output in response to voice frequencies applied to its input and said receiver including a demodulator for supplying a voice frequency current to its output in response to a carrier telephone current applied to its input, a microphone coupled to the input of the transmitter and a loud-speaker coupled to the output of the receiver; a recorder-reproducer including a first means to record the message of a voice frequency current and a second means to create a voice frequency current of a recorded message, and circuit means including manually operable circuit controlling contact devices and a current source to provide four different circuit connections to couple said first and second means of recorder-reproducer to said transmitter and said receiver in such manner that with a first one of said connections the message of a telephone current received from said transmitting channel is recorded, with a second one of said connections a recorded message is sounded at the loud-speaker, with a third one of said connections the message spoken into said microphone is recorded and with a fourth one of said connections a recorded message is converted into telephone current and supplied to the transmitting channel.

4. In combination with railway train communication apparatus using a carrier telephone current, means including a receiver which is provided with a demodulator and an audio frequency amplifier, a loud-speaker coupled to the output of said amplifier to sound the message of such telephone current, a recorder including means operable to record the message of a voice frequency current; and circuit means including a microphone disposed for acoustic relationship with said loud-speaker connected to said means of said recorder to record the message of such carrier telephone current.

5. In combination with railway train communication apparatus using a carrier telephone current for transmission of train orders, means including a receiver which is provided with a demodulator having an input disposed to receive such carrier telephone current and an output connected to the input of an audio amplifier, means including a loud-speaker coupled to the output of said amplifier to sound the train orders of such telephone current, means including a recorder-reproducer operable to either record a voice frequency current or to reproduce a voice frequency current of a record, a first circuit means including a microphone disposed for acoustic relationship with said loud-speaker and a contact of a multiple position switching device connected to said recorder-reproducer to record a train order simultaneously with the sounding of the order at the loud-speaker; and a second circuit means including a current source and another contact of said switching device to connect said recorder-reproducer to the input of said audio amplifier to sound at the loud-speaker a recorded train order.

HERBERT A. WALLACE.

REFERENCES CITED

The following references are of record in the file of this patent:

UNITED STATES PATENTS

| Number | Name | Date |
|---|---|---|
| 1,845,034 | Bickehaupt | Feb. 16, 1932 |
| 2,064,639 | Whitelock et al. | Dec. 15, 1936 |
| 2,142,874 | Sadowsky | Jan. 3, 1939 |
| 2,261,420 | Shively et al. | Nov. 4, 1941 |
| 2,284,173 | Soukup et al. | May 26, 1942 |